June 1, 1948. C. R. S. SEARS ET AL 2,442,712
PLOW
Filed April 3, 1944 2 Sheets-Sheet 1
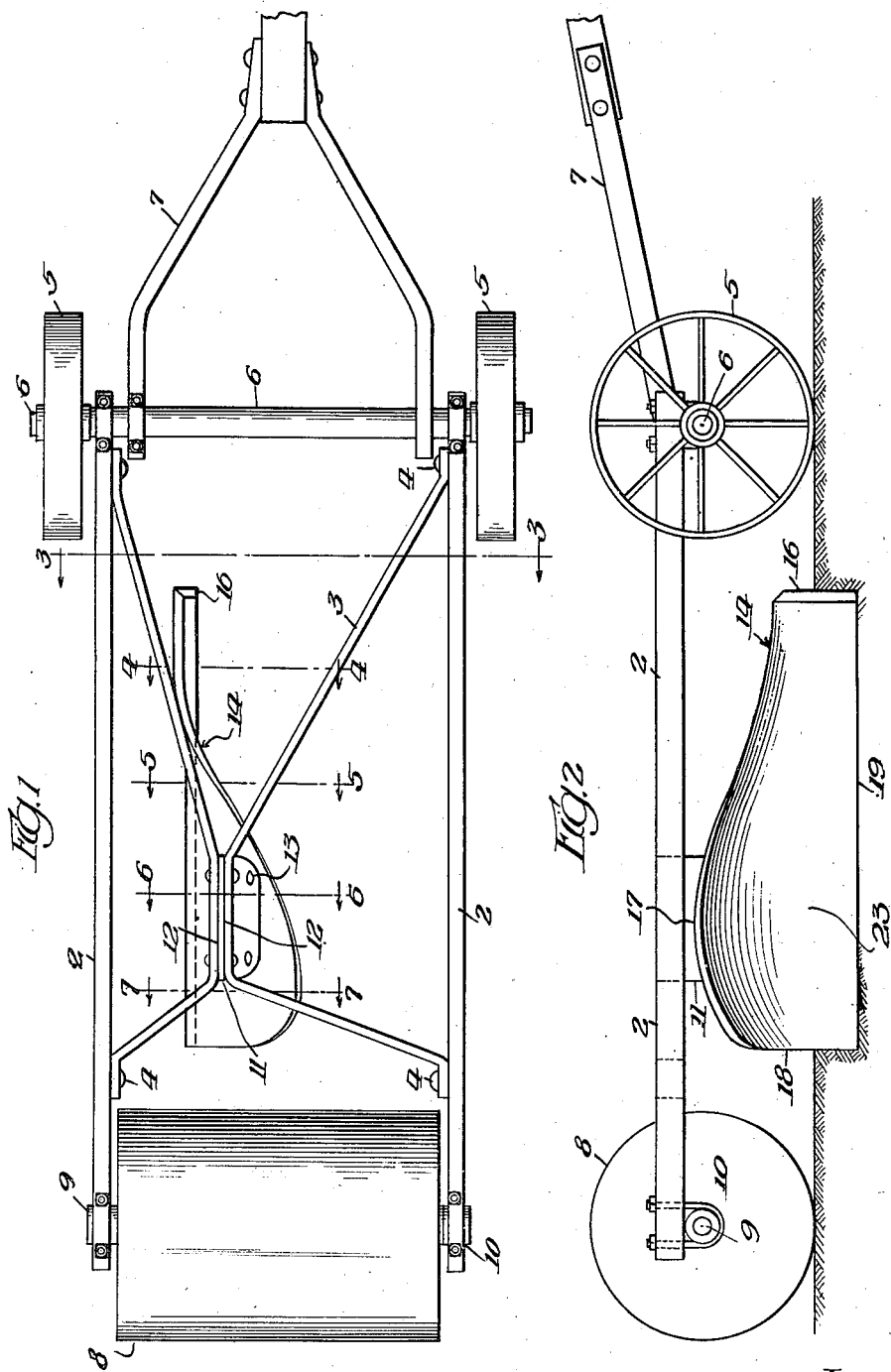
Inventors
Charlotte Ruby Smith Sears
and Richard W. Sears II,
By Spencer, Marzall, Johnston & Cook Attys

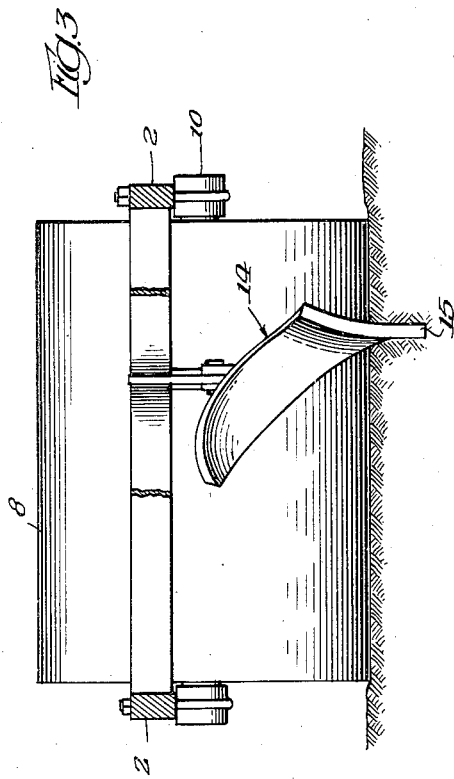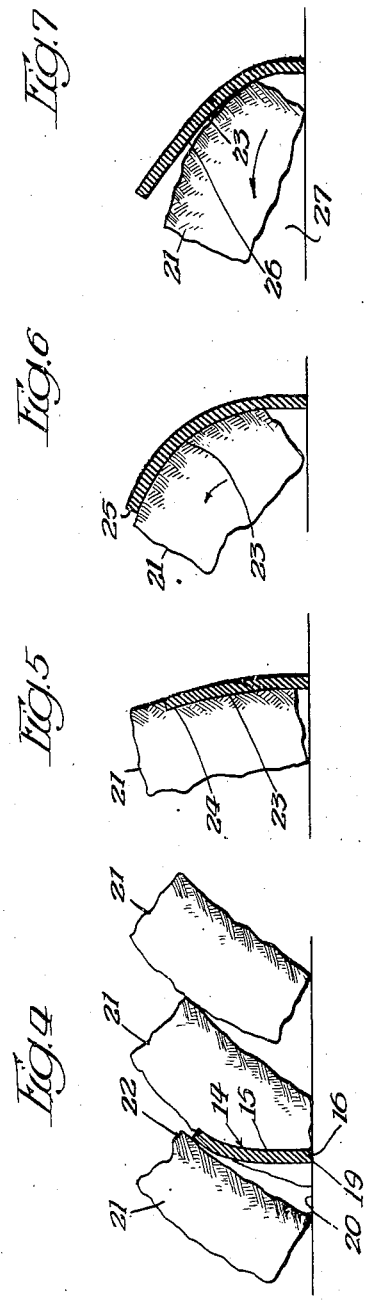

Patented June 1, 1948

2,442,712

UNITED STATES PATENT OFFICE 2,442,712

PLOW

Charlotte Ruby Smith Sears and Richard W. Sears, II, Evanston, Ill.

Application April 3, 1944, Serial No. 529,360

3 Claims. (Cl. 97—113)

This invention relates to a farming implement, and its primary object is the provision of a farming implement for use in the process of sub-surface tillage and fertilization, which implement replaces sod previously stood on edge by a previous plowing operation.

Another object of the invention resides in a farming implement having a soil engaging member adapted to engage the furrow between the sod rows to move the sod in a direction opposite that which it assumes after being stood on end and to replace such sod to substantially original position before being stood on end.

Still another object of the invention resides in a farming implement having a forward edge inclining a certain distance beyond a vertical line at the front thereof, with the main body portion inclining at a substantial angle on the opposite side of the vertical line, whereby to replace sod stood on edge to substantially its original position prior to being stood on end.

Another object of the invention consists in the method of cultivating soil by the replacing of sod which has been previously stood on edge by a prior plowing operation so as to bring back the sod to substantially its former original position.

Numerous other objects and advantages will be apparent throughout the progress of the following specification.

The accompanying drawings illustrate a selected embodiment of the invention and the views therein are as follows:

Fig. 1 is a detail top plan view of the improved farming implement;

Fig. 2 is a detail side elevational view thereof;

Fig. 3 is a detail sectional view on the line 3—3 of Fig. 1;

Fig. 4 is a detail sectional view on the line 4—4 of Fig. 1, showing the contour of the blade and position of the sod at the forward end of the body member; and Figs. 5, 6, and 7 are detail views taken on the lines 5—5, 6—6, and 7—7, respectively of Fig. 1 showing the contour of the blade and the respective positions of the sod, and showing the manner in which the soil is progressively returned to its substantially normal position prior to the plowing operation which has stood the sod on end.

The particular implement herein shown for the purpose of illustrating the invention comprises a body member or frame 1 having spaced side bars 2, 2 to which supporting elements 3 are connected, as indicated at 4. The forward end of the frame 1 may be supported for traction by wheels 5 mounted on a transverse axle 6. An attaching member 7 is operatively secured to the framework whereby the implement may be attached to a tractor or other pulling means for moving the implement along the ground. The rear end of the frame or support 1 may be connected to a roller 8 mounted on an axle 9 suitably housed in bearings 10 secured to the side bars 2. An attaching plate 11 may be secured between the opposed inner faces 12 of the supporting members 3. This attaching plate 11 is secured, as indicated at 13, to the body member 14 of the implement.

The body member 14, in the form of a continuous plate, is provided with an extreme front end 15 which extends in a vertical direction but which inclines a certain distance beyond a vertical line, to the right as shown in Figs. 3 and 4. The body from front to rear inclines progressively from a point on one side of a vertical line at the front to a point on the other side of the vertical line, as shown in Figs. 3, 5, 6, and 7. The body 14 also slopes or inclines upwardly from its front nose portion 16 to its maximum point of vertical inclination, as indicated at 17, Fig. 2, where it slopes downwardly to its extreme rear end 18. The body 14, therefore, is inclined longitudinally and inclines transversely a certain distance on one side of a vertical line progressively toward the rear where it inclines at a steep angle at the rear end of the body. The bottom edge or sole 19 of the body 14 is adapted to engage the bottom of a furrow 20 which has been previously created by means of a former plowing operation which has stood the sod 21 on edge, as shown in Fig. 4.

The implement when being propelled will have its nose 16 inclined on one side of a vertical center line, as indicated at 22 in Fig. 4, whereupon it will fit between the various rows of stood-on-edge sod. The movement of the implement will then cause a row of stood-on-edge sod to be engaged by the acting surface 23 of the body 14, whereupon the sod will become engaged with a part of the surface 23 of the body 14 at a point where the progressive arcuate inclination of the body, as indicated at 24, Fig. 5, will turn the sod from the position shown in Fig. 4 to the position shown in Fig. 5. The sod is then acted upon progressively by the surface 23 of the body until it contacts with the surface 23 of the body 14 which is of still greater arcuate angularity, as indicated at 25 in Fig. 6. At or toward the end of the body 14 the surface 23 will be at its greatest angularity on the other side opposite the vertical, as indicated at 26 in Fig. 7, whereupon the formerly stood-on-end sod will be practically completely turned over and almost in its original position, whereupon the sod will gravitate to its substantially original position. If desired, auxiliary mechanism, not disclosed, may be provided for supplying fertilizer beneath the sod at the point indicated at 27, Fig. 7, during the soil turning operation at any time prior to the time the soil is re-laid to substantially its original position.

The farming implement herein disclosed is adapted to co-operate with a conventional plow for returning sod to its substantially original position after the sod has been turned over or stood on end by a previous plowing operation. The present implement is adapted for use in series with a plow which precedes it, and may be attached to the plow or it may be placed behind the plow and propelled by the same mover which translates the plow. The broad aspect of the invention contemplates the returning of sod substantially to its original position, whether or not the returning operation follows immediately the plowing operation or if it is done at a subsequent time.

Applicants' co-pending application Serial No. 522,218, filed February 14, 1944, is arranged to lift sod and then return the lifted sod in a substantially continuous operation, and includes the provision of supplying fertilizer under the sod, while lifted, and before it is returned. The present implement returns previously turned over or stood-on-end sod substantially to original position. It, like the invention disclosed in the co-pending application, also contemplates the application of fertilizer under the sod prior to its return to original position.

The invention provides an implement for use in the process of sub-surface tillage and fertilization by the provision of a body member having its forward guiding edge inclined to one side of the vertical, with the rest of the body inclining to the other side of the vertical, whereby the device may easily be guided between the various rows of sod which were formerly stood on end and re-turn the sod in its opposite turned direction to bring the previous upper surface again toward the top.

Changes may be made in the form, construction and arrangement of the parts without departing from the spirit of the invention or sacrificing any of its advantages, and the right is hereby reserved to make all such changes as fairly fall within the scope of the following claims.

The invention is hereby claimed as follows:

1. A plow comprising a body member in the form of a continuous generally vertical plate extending from front to rear, the extreme forward edge of the body being vertical at its lower edge and inclining from bottom toward the top to a point on one side of a vertical line, the top edge of said body sloping from the forward edge rearwardly to a point on the opposite side of the vertical line.

2. A farming implement adapted for turning over sod which has been previously stood on end by a prior plowing operation to return the stood on end sod to substantially its original position, and comprising a body member in the form of a plate, its extreme forward end vertical and inclining laterally from bottom to top at its frontal point on one side of a vertical line, said plate inclining vertically progressively from said forward end to a point on the other side of the vertical line towards the rear thereof, said body being arcuate in cross section and its top edge inclining longitudinally upwardly and increasing in inclination from front to rear.

3. A farming implement adapted for turning over sod which has been previously stood on end by a prior plowing operation to return the stood on end sod to substantially its original position, and comprising a body member in the form of a plate its extreme forward end vertical but inclining laterally from its bottom towards the top at its frontal point on one side of a vertical line, said plate inclining vertically progressively from the forward end to a point on the other side of the vertical line towards the rear thereof, said body having its top edge inclining longitudinally upwardly from its front towards the rear and then downwardly thereafter.

CHARLOTTE RUBY SMITH SEARS.
RICHARD W. SEARS, II.

REFERENCES CITED

The following references are of record in the file of this patent:

UNITED STATES PATENTS

| Number | Name | Date |
|---|---|---|
| 863,513 | Deer | Aug. 13, 1907 |
| 1,006,458 | Beange | Oct. 24, 1911 |
| 1,939,958 | Dias | Dec. 19, 1933 |
| 2,125,036 | Stewart | July 26, 1938 |